United States Patent [19]

Berg et al.

[11] B 3,998,778

[45] Dec. 21, 1976

[54] POURABLE ELASTOMERIC PARTICLES

[75] Inventors: Gerhard Berg; Karl-Heinz Nordsiek; Gunter Maahs; Wilhelm Schanzer, all of Marl, Germany

[73] Assignee: Chemische Werke Huels Aktiengesellschaft, Marl, Germany

[22] Filed: Nov. 4, 1974

[21] Appl. No.: 520,658

[44] Published under the second Trial Voluntary Protest Program on March 9, 1976 as document No. B 520,658.

Related U.S. Application Data

[62] Division of Ser. No. 270,003, July 10, 1972, Pat. No. 3,846,365.

[30] Foreign Application Priority Data

July 15, 1971 Germany .......................... 2135266

[52] U.S. Cl. .................. 260/33.6 AQ; 252/62.1 P; 260/42.29; 260/42.32; 260/42.33; 260/42.37; 260/42.39; 260/42.43; 260/42.46; 260/42.47; 526/20; 526/30; 526/339; 526/348; 528/503

[51] Int. Cl.$^2$ ..................... C08K 3/04; C08K 3/36; C08K 5/01

[58] Field of Search ............ 252/62.1 P; 260/42.37, 260/33.6 AQ, 42.29, 42.32, 42.33, 42.39, 42.43, 42.46, 42.47, 80.6, 83.7, 88.2 R, 93.1, 94.2

[56] References Cited

UNITED STATES PATENTS 3,326,848  6/1967  Clemens et al. .................. 260/34.2
3,849,363  11/1974  Maass et al. .................... 260/42.37
R25,136    3/1962  Carlson ......................... 252/62.1 P

OTHER PUBLICATIONS

Noble–*Latex in Industry*, (2nd Ed.) (Rubber Age) (N.Y.) (1953), pp. 357–359 and 377–381.
Morton–*Introduction to Rubber Technology*," (Reinhold) (N.Y.) (1959), pp. 34–39, 234–235.

*Primary Examiner*—Donald E. Czaja
*Assistant Examiner*—H. H. Fletcher
*Attorney, Agent, or Firm*—Millen, Raptes & White

[57] ABSTRACT

Discrete, finely divided, tack-free elastomer particles are prepared from a filler-containing aqueous elastomer emulsion containing an aqueous emulsion of an elastomer dissolved in a volatile inert organic solvent having an emulsifying amount of a quaternary ammonium salt cationic surfactant and an aqueous suspension or dispersion of a solid, finely divided elastomer filler, which process comprises gradually introducing the filler-containing aqueous elastomer emulsion into an aqueous alkali silicate solution while maintaining said solution at a pH greater than 2 and simultaneously evaporating the organic solvent to form discrete, finely divided, tack-free elastomer particles.

The process can be applied to solid elastomers or to post-polymerization elastomer solutions, and is particularly suitable for preparing pourable, carbon black containing elastomer particles to be formed into shaped objects.

12 Claims, No Drawings

POURABLE ELASTOMERIC PARTICLES

This is a division of application Ser. No. 270,003, filed July 10, 1972 now U.S. Pat. No. 3,846,365.

BACKGROUND OF THE INVENTION

1. Field of the Invention

This invention relates to the preparation of discrete, finely divided, tack-free elastomer particles. More particularly, this invention relates to a process for preparing such particles from solution of an elastomer in a organic solvent.

2. Description of the Prior Art

The processing of thermosetting elastomers into shaped objects is normally a multistage procedure. In contrast to the manufacture of molded components from thermoplastic synthetic resins, it is absolutely necessary, prior to the final shaping step, to conduct generally complicated mixing processes to obtain homogeneous incorporation of diverse additives prior to the cross-linking reaction. The relatively high viscosity of the raw materials makes it necessary to utilize heavy machines, e.g. rolling mills or internal mixers, which perforce require a high energy consumption. The inherent considerable costs of such energy and equipment greatly impair the economy of the production of elastomeric materials.

The statistical distribution homogeneity required of the various components in the elastomer mixtures necessitates, in addition to high equipment investment costs, considerable expenditures in time and energy. During solid state homogenization, the rubber particles and the filler particles are displaced against a strong resistance with respect to one another. Even those portions of the mixture which are sufficiently homogeneous must be further subjected to the mixing procedure until a satisfactory dispersion of the entire mixture has been achieved. The frictional heat generated requires a discontinuous mode of operation. In order to minimize the danger of premature vulcanization, at least a portion of the vulcanizing agents are not added until a second operating step. However, the preparation of crosslinkable elastomers sufficiently stable for even intermediate storage periods requires expensive measures and is effected, in modern large-scale plants, by expensive pelletizing and storage in rotating containers. Further processing involves the subsequent preparation of a blank on calenders and/or extruders, depending on the type of the finished article. The conventional production method is then completed by vulcanization in presses or autoclaves.

Due to the characteristic properties of the raw elastomer material, severe limitations have been encountered in numerous attempts to devise economical, and especially automated manufacturing methods. In order to simplify the aforementioned operating steps, the masterbatches comprising coprecipitates of aqueous elastomer emulsions with carbon black have been proposed, by means of which other mixture components can be incorporated. However, due to their strong inherent tackiness, such raw elastomer mixtures are commercially prepared as bales of hard, solid consistency analogous to the filler-free polymers. Consequently, in spite of cost savings in producing the basic mixture, the machinery traditionally utilized for further processing operations could not be eliminated.

In another attempt to simplify production of elastomer-filler mixtures, a specific precipitation technique was developed to manufacture coprecipitates from synthetic rubber latices (e.g., SBR emulsion polymers) and highly active silicic acid. In this technique, latices containing anionic emulsifiers are mixed with an alkali silicate solution and precipitated with acid in the presence of electrolyte solutions. Examples of such techniques are described in German Pat. Nos. 1,148,067; 1,204,404; 1,297,858; 1,204,405; 1,215,918; and 1,245,093.

The elastomer mixtures obtained by the above method are very fine powders. It is possible to incorporate further additives into these elastomer mixtures with the use of simple agitator systems and without any substantial plasticizing and mixing procedures, and to utilize such elastomer mixtures directly for processing into rubber articles according to conventional methods, e.g., as taught in German Pat. Nos. 1,148,067 and 1,196,367. However, such coprecipitates are not suitable for broad scale applications, since it has heretofore been difficult if no impossible to produce powdery, carbon-black-containing rubber mixtures in this manner.

Other processes for producing carbon-black-containing rubber mixtures from rubber solutions are known, e.g. the so-called "Hydro-Solution-Masterbatch Method" taught in U.S. Pat. No. 2,769,795; Belgian Pat. Nos. 619,992 and 620,801; and French Pat. Nos. 1,440,470, 1,443,769, and 1,371,688, but pourable elastomer mixtures in the form of powders or granules are not obtained by this technique.

In view of the above-described difficulties in these prior art techniques, there is a genuine need for economical processes for the production of pourable, powdery, filler-containing elastomer mixtures, especially for carbon-black-containing elastomers widely used in the rubber industry.

OBJECTS OF THE INVENTION

Accordingly, it is a object of this invention to provide a process for preparing discrete, finely divided, tack-free elastomer particles.

Another object of this invention is to provide a process for preparing discrete, finely divided, tack-free elastomer particles from a solution of an elastomer in an inert organic solvent.

A further object of this invention is to provide a process for preparing discrete, finely divided, tack-free elastomer particles containing a carbon black filler.

An additional object of this invention is to provide a process for preparing discrete, finely divided, tack-free elastomer particles containing a mineral oil plasticizer.

A more particular object of this invention is to provide pourable elastomer particles containing a carbon black filler.

Other objects and advantages of this invention will become apparent to those skilled in the art upon further study of the specification and appended claims.

SUMMARY OF THE INVENTION

Briefly, the above and other objects are attained in one aspect of this invention by providing a process for preparing discrete, finely divided, tack-free elastomer particles from a filler-containing aqueous elastomer emulsion containing an aqueous emulsion of an elastomer dissolved in a volatile inert organic solvent having an emulsifying amount of a quaternary ammonium salt catonic surfactant and an aqueous suspension or dispersion of a solid, finely divided elastomer filler, which process comprises gradually introducing the filler-containing aqueous elastomer emulsion into an aqueous alkali silicate solution while maintaining said solution at a pH greater than 2 and simultaneously evaporating the organic solvent to form discrete, finely divided, tack-free elastomer particles.

DETAILED DISCUSSION

It has now been found possible to produce in a simple and economical manner pourable, powdery, optionally filler-containing, particularly carbon-black-containing elastomer mixtures by emulsifying elastomer solutions, optionally containing mineral oil plasticizers, in water and mixing the thus-obtained emulsions with fillers, particularly carbon blacks, suspended or dispersed in water, if the elastomer solutions which optionally contain mineral oil plasticizers are emulsified in water in the presence of quaternary ammonium salts. Suspensions or dispersions of solid fillers, preferably carbon blacks, are introduced into these emulsions; and the filler-containing, aqueous emulsions of the elastomer solutions are introduced into a hot, aqueous alkali silicate solution wherein the pH during the entire precipitation process lies above 2, preferably between 7 and 12. The elastomer solvent is thereby simultaneously distilled off and the elastomer mixture, which contains fillers, optionally together with mineral oil plasticizers, is separated in a finely divided form from the water and dried.

The process of this invention represents a combination of measures critical thereto for the production of pourable, powdery, filler-containing elastomer mixtures.

The term "elastomer" as used herein refers to those natural or synthetic polymers which have a high tensile strength in the solid state and which stretch under tension and retract rapidly to their original dimensions. The term "vulcanizable" as used herein refers to those elastomers which are sufficiently uncrosslinked to be soluble in a suitable organic solvent having a boiling point below that of water and which are capable of being crosslinked, e.g. by vulcanization, into a relatively insoluble form.

Elastomers useful in the present invention include but are not limited to: natural rubber; homopolymers, e.g., polychlorobutadiene, polybutadiene, polyisoprene, and polyisobutylene; copolymers, e.g., styrene-butadiene rubber, butyl rubber, nitrile rubber, ethylene-propylene copolymers, ethylene-propylene-diene, copolymers, fluorine elastomers, and polyacrylates; polycondensation products, e.g. polyurethanes, silicone rubbers, and polysulfide rubbers; and elastomers prepared by the chemical conversion of high polymers, e.g. halogen substituted rubbers or rubbers produced by the polymerization and plasticization of vinyl chloride.

Preferred elastomers are those which have been prepared by solution polymerization using an ionic catalyst, e.g. the Ziegler-Natta, Alfin, or lithium-based catalysts in an inert organic solvent having a boiling point below that of water. Solutions of these elastomers can be converted directly into pourable particles without intermediate recovery of the polymerization product. Preferred elastomers in this connection are rubbery polymers, e.g. styrene-butadiene, polychloroprene, butyl rubber, nitrile rubber, polybutadiene, polyisoprene, ethylene-propylene, ethylene-propylene-diene, natural rubber, and polyalkenamers such as polyoctenamer.

All known elastomer types soluble in organic solvents, including natural rubber, are suitable for the present process. Advantageously, polymers can be employed which cover a very wide range with respect to their molecular weights. Products having a solution viscosity [ ] of between 0.1 dl./g. and 10 dl./g. can be used without any difficulties. The elastomer solutions are produced in a conventional manner by solution polymerization in the presence of, for example, Ziegler catalysts, Li catalysts, or Alfin catalysts, with the use of solvents such as pentane, hexane, heptane, and isooctane. Preferred are those polymers which can be produced in an aliphatic solvent and can be utilized immediately in the form obtained upon polymerization, after an appropriate working-up step.

The elastomer solutions used in this invention contain 1 to 50, preferably 5 to 25, especially 10 to 20 percent by weight of elastomer.

The use of greatly excessive amounts of solvent is possible but requires more stringent conditions to evaporate the solvent during the precipitation step.

The solvents useful in this invention can be any liquid organic compound in which the elastomer is soluble and which are volatile, i.e. which have a boiling point below that of water in the aqueous emulsion of the elastomer-solvent solution in water. These volatile solvents, which generally boil at least 10°C and preferably at least 20°C below the boiling point of water, and which are inert, i.e. do not deleteriously react with the elastomer under the reaction conditions encountered in the process of this invention, are known in the art. Solvents or solvent mixtures which form an azeotrope, especially a negative azeotrope with water are preferred. Suitable inert organic solvents meeting these criteria include but are not limited to alkanes and cycloalkanes, preferred are linear or branched alkanes of 5–8 carbon atoms, e.g. pentane, hexane, heptane, and isooctane.

Furthermore, the elastomer solutions can be produced by the redissolution of finished polymers, and accordingly emulsion polymers are also usable in the process of this invention.

The process of the present invention is especially advantageous for use with special elastomers adapted to specific requirements, e.g. polybutadiene of a special 1,2-content having a vinyl group content of 15 to 75%, preferably 20 to 50%, polyalkenamers and thermoplastic elastomers.

While, for example, the conventional known mixing technique fails when using either very high or very low molecular weight raw material, it is possible to attain an optimum distribution of filler and/or auxiliary agents with the process of this invention, independently of the molecular weight, which considerably exceeds the customary homogeneity attainable by mechanical mixing processes.

Preferred fillers are the carbon blacks customary in the rubber industry, which include carbon blacks of all stages of activity; suitable carbon blacks include but are not limited to SAF (super abrasion furnace), ISAF (intermediate super abrasion furnace), HAF (high abrasion furnace), FEF (fast extruding furnace) and MT (medium thermal) blacks. In addition to or in place of one or more carbon blacks, it is also possible to incorporate mineral substances, e.g. highly active silicic acid, kaolin, ground slate, etc. All fillers are mixed, as emulsifier-free aqueous suspensions or as emulsifier-containing aqueous dispersions, with the aqueous elastomer emulsion, e.g. by simple stirring. The emulsifiers to be used for the production of the emulsifier-containing aqueous dispersions are advantageously the same quaternary ammonium salts which are employed in the production of the emulsions from elastomer solutions and water. The amount of carbon black to be utilized between 1 and 200 wt. %, preferably between 40 and 110 wt. %, based on the weight of the elastomer. The quantity of light-colored fillers is between 1 and 400 wt. %, preferably between 25 and 150 wt. %, based on the weight of the elastomer.

Suitable mineral oil plasticizers are the refinery products customarily employed for this purpose, which, depending on the purpose for which they are to be used, can contain aromatic, naphthenic or paraffinic hydrocarbons.

It is possible according to the process of this invention to incorporate into the elastomer phase not only fillers, e.g. carbon black or silicic acid in an optimum dispersion and in almost any desired amounts, but also all auxiliary agents required for the vulcanization, e.g. antiaging agents, zinc oxide, stearic acid, sulfur, vulcanization accelerators, etc.

In order to produce a carbon black-oil-elastomer mixture, it is necessary to admix the oil and the elastomer solution prior to emulsification. These oil-extended elastomer mixtures can also be precipitated in powder form according to the process of this invention and can again be ground into powders after drying.

One variant of the process resides in stirring the oil and the fillers together into the elastomer solution prior to emulsification. This is accomplished, for example, by suspending or dispersing the carbon black, e.g. by means of a colloid mill, in hexane or in the mineral oil plasticizer, and then stirring this suspension or dispersion into the elastomer solution. Thereafter, the solution, which contains all of the fillers, is emulsified in water according to this invention. Subsequent process steps are identical to those described hereinabove.

The quaternary ammonium salts useful in this invention are cationic surface-active organic nitrogen compounds having a structure which includes a central nitrogen atom joined to four organic groups as well as to an acid radical, and include pentavalent ring compounds, e.g. lauryl pyridium chloride. Preferred quaternary ammonium salts are those of the formula $(NR_1R_2R_3R_4)+ X$—wherein $R_1$, $R_2$, $R_3$ and $R_4$ are each aliphatic, particularly alkyl of 1-20 carbon atoms or araliphatic, particularly aralkyl of 6- 20 carbon atoms, especially benzyl, and X is halogen, preferably chlorine or bromine, bisulfate or sulfate. Especially preferred are compounds of the above formula wherein at least two of $R_1$, $R_2$, $R_3$ and $R_4$ are lower alkyl of 1—3 carbon atoms, particularly methyl or ethyl, and wherein one of $R_1$S $R_2$, $R_3$ $R_4$ is an aliphatic hydrocarbon radical of 12–18 carbon atoms. Preferred pentavalent ring-containing quaternary ammonium salt emulsifiers are the N-substituted pyridine salts, especially those substituted on the nitrogen atom with an aliphatic hydrocarbon group 12–18 carbon atoms, particularly alkyl.

Suitable quaternary ammonium salt emulsifiers include but are not limited to lauryldimethylbenzylammonium chloride, cetyltrimethylammonium bromide, lauryldimethylethylammonium ethyl sulfate, alkyl($C_{12}$ to $C_{16}$)-trimethylammonium bromide, coconut dimethylbenzylammonium chloride, cetyldimethylbenzylammonium chloride, cetyldimethylethylammonium ethyl sulfate distearyldimethylammonium chloride, as well as N-substituted salts of pyridine, e.g. laurylpyridinium chloride, cetylpyridinium bromide, tetradecylpyridinium bromide and laurylpyridinium bisulfate. Emulsifying amounts of these quaternary ammonium salts are suitably 0.05-2%, preferably 0.1-1%, based on the weight of the elastomer solution.

Suitable precipitants are aqueous solutions of water soluble alkali silicates. Alkali silicate solutions are preferably sodium silicate solutions having molar ratios of $Na_2O : SiO_2$ of 2 : 1 to 1 : 4. The amounts of $SiO_2$ contained in the alkali silicate solution, which are necessary for precipitation, are generally 2-20 moles, preferably 4–12 moles per mole of the quaternary ammonium salt.

The pH of the aqueous alkali silicate solution is maintained above 2, preferably between 7 and 12, in order to avoid a condensation reaction of the silicate anions.

The filler-containing aqueous elastomer emulsion is gradually introduced into the alkali silicate solution either batchwise or continuously under conditions which simultaneously remove the organic solvent component, preferably at a rate whereby the solvent is removed as rapidly as it is introduced. While these conditions can be provided by various means, e.g. evaporation under reduced pressure, it is advantageous to effect removal of the organic solvent component by providing a hot aqueous alkali silicate solution at a temperature above the boiling point of the inert organic solvent in the aqueous emulsion. In this connection, the use of inert organic solvent which forms a negative azeotrope with water is especially advantageous due to the low boiling point of the azeotrope.

The elastomer solutions are accordingly introduced into the precipitant at a temperature which is above the azeotrope boiling point of solvent and water, preferably 30°–95°C.

The process of this invention thus involves the following measures: The elastomer solutions which optionally contain a mineral oil plasticizer and which are preferably a solution of elastomer is a volatile, normally liquid aliphatic hydrocarbon, are emulsified in water, in the presence of the quaternary ammonium salts of the present invention, with the aid of dispersing devices, e.g. agitators, mills, ultrasonic mixers or mixing nozzles. The emulsification is conducted in most cases at room temperature; however, it may in some cases be advantageous to operate at temperatures of between 0° and 70°C., and particularly between 20° and 50°C.

The volume ratio of the aqueous phase to the organic solvent phase in the aqueous emulsion is generally 0.25 to 2.5:1, preferably 0.5 to 1.5:1. Following emulsification, the suspension or dispersion of the fillers, preferably carbon black, as well as of any solid auxiliary agents required for the vulcanization, e.g. antiaging agents, zinc oxide, stearic acid, sulfur, and vulcanization accelerators, etc., is introduced into the emulsion. The aqueous emulsion of the elastomer solution obtained in this way and containing all auxiliary agents is gradually, preferably continuously introduced into a precipitating bath comprising a hot aqueous alkali silicate solution.

The volume ratio of the aqueous suspension or dispersion of filler to the aqueous emulsion is generally 0.2 to 2.0:1, preferably 0.5 to 1.5:1.

The precipitation procedure and the distilling off of the solvent are conducted in a single step without troublesome foam formation, preferably under agitation, at temperatures above the azeotrope boiling point of the organic solvent and water. The filler-containing aqueous elastomer emulsion is gradually introduced into a 0.5 to 5 fold volume of alkali silicate solution. In this procedure, the filler-containing elastomer mixture which optionally contains mineral oil plasticizers is obtained in an unusually finely particulate, non-tacky form, wherein the average diameter of the particles vary between 1 and 500 $\mu$, preferably between 10 and 200 $\mu$.

The elastomer mixture, produced in a finely divided form after the precipitation and after removing the organic solvent, is freed of the main amount of water, i.e. generally 98.5 to 99.8% of the water present is removed, e.g. by conventional filtration or decanation on screens, rotary cellular filters, suction filters, centrifuges, or the like and is dried according to conventional methods, e.g. in belt dryers, drum dryers, fluidized-bed or spray-drying plants, preferably under continuous movement. The thus-obtained elastomer particles are pourable, tack-free, i.e. exhibit extremely little if any tackiness, and can be ground, if necessary, into powders of any desired grain sizes, e.g. in suitable mills.

In addition to preparing directly vulcanizable particulate elastomer compositions, the present invention can be utilized to prepare intermediate particulate compositions into which additives can be subsequently incorporated prior to vulcanization.

In a further embodiment of the present invention, the pourable elastomer particles produced according to this invention are used for the production of shaped elastomer articles, optionally with the concomitant employment of additional auxiliary agents, and either with or without the use of further plasticizing treatment. The vulcanized products of this invention demonstrate in each case a greatly improved physical property spectrum as compared to samples mixed under conventional mechanical conditions, i.e. those described by S. Bostrom, *Kautschuk—Handbuch*, Volume 2 (1960), chapter 2 "Verarbeitungstechnik".

If auxiliary agents are to be admixed to the particulate elastomer mixtures for further processing at a later date it is possible to conduct such admixing by means of very simple agitator systems, e.g. the Loedige, Papenmeier, of Henschel mixers. For purposes of final shaping, the powder mixture can be directly fed into extruders, calenders, transfer molding systems, or automatic injection molding machines. When introducing the elastomer mixture of the present invention into a rolling mill, a smoth sheet is obtained after only a single pass. The conversion from the powdery into the plastic state thus requires only minimum expenditure. Consequently, it is possible in a surprisingly simple manner to utilize the elastomer mixture directly in the final stage of the conventional elastomer processing operation, without the use of heavy mechanical devices. In this way, it is possible to manufacture directly flawless elastomer articles usable for technical application with a reduced number of production stages using economical and automated processing methods, and with greatly reduced investment costs.

The invention will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. Unless otherwise indicated, all percentages are by weight. Comparison materials used as controls were prepared in the following way: In a masticator the elastomer in kneaded 1 minute at a temperature of 50°C. Then the compounding ingredients, e.g. carbon black, oil, zinc oxide, stearic acid, but without sulfur and vulcanization accelerator are added. The mixture is kneaded for 9 minutes and then rolled. After a storage period of 6 hours, sulfur and vulcanization accelerator are added and the mixture is rolled again at a temperature of 50°C during a time period of 5 minutes. After this procedure the mixture is ready for the vulcanization.

EXAMPLE I

20 Kg. of a 10% solution of a polybutadiene having a vinyl group content of 35% and a solution viscosity of $\eta = 2.5$ dl./g., which was prepared by solution polymerization of butadiene with a butyllithium catalyst, is emulsified in 19.9 l. of water with the aid of an ultrasonic emulsifying device (commercial name: "Ultra-Turrax" mixer) in the presence of 60 g. of cetyltrimethylammonium chloride ("Dehyquart A") and 100 g. of 10% sulfuric acid. 20 kg. of a 5% aqueous suspension of FEF carbon black ("Corax A") is introduced into the thus-obtained emulsion. The resultant stable, carbon-black-containing emulsion is immediately allowed to flow into a kettle having a capacity of 150 l. which is filled with an agitating mixture of 90 l. of water and 900 g. of a 26% aqueous sodium silicate solution, at a pH of 10.4 and a temperature of 80°-90°C. The elastomer mixture precipitates at once as a powder (particle size between 5 and 200 $\mu$), while simultaneously the hexane solvent is distilled off without foaming. The powder is vacuum-filtered after the hexane has been removed by evaporation, and is dried under vacuum at 75°C. The carbon black batch can be ground in a mill into a pourable and non-tacky powder of any desired granular size. The powder is thereafter introduced into a 200 × 450 mm. rolling mill preheated to 50°C. A smooth sheet is obtained after only a single pass. 2.0 parts of sulfur, 1.5 parts of N-cyclohexylbenzothiazole sulfenamide "Vulkacit CZ", 3 parts of ZnO, and 2 parts of stearic acid, based on the proportion of rubber, are gradually admixed thereto over a three minute time period.

The data for the vulcanizate obtained after vulcanization at 143°C are compiled as Experiment 1 in the Table and compared with the data of vulcanizates of the same composition produced from a solid rubber as Experiment 2. The improved filler distribution of the rubber mixture of this invention is clearly apparent in the increased tensile strength properties.

EXAMPLE II

20 Kg. of a 10% solution in hexane of a polybutadiene having a 1,2-content of 35%, produced in accordance with Example 1, is mixed, using the Ultra-Turrax mixer, with a solution of 20 kg. of water and 140 g. of alkyl trimethylammonium bromide (alkyl = $C_{12} - C_{16}$; trade name "Vantoc N") 28 kg. of a 5% aqueous suspension of HAF carbon black ("Philblack O") is introduced into the thus-obtained emulsion under agitation. The carbon-black-containing aqueous emulsion of the elastomer solution is gradually admixed in a 150 liter kettle at a pH of 10,8 and a temperature of 80°-90°C, with a solution of 90 l. of water and 1.8 kg. of a 26% sodium silicate solution. The carbon-black-containing elastomer precipitates into powdery particles having a granular size of 2–250 μ, while hexane organic solvent is distilled off without foaming. The resultant elastomer mixture is suction-filtered and dried in a fluidized bed charged with hot nitrogen at 95°C. A non-tacky, pourable powder is recovered.

The dry powder is admixed in a Papenmeier powder mixer with 1.5 parts of sulfur; 0.9 part of N-cyclohexylbenzothiazole sulfenamide "Vulkacit CZ"; 3 parts of ZnO; and 2 parts of stearic acid, based on 100 parts of elastomer. The resultant mixture is thereafter converted for 30 seconds on a rolling mill into a 6 mm thick sheet. Vulcanization at 143°C yielded a vulcanized elastomer having the properties shown as Experiment 3 in the Table in comparison with a vulcanizate of the same composition produced under conventional conditions from solid rubber by means of internal mixers and/or rolling mills, shown as Experiment 4. The tensile strength properties of products prepared according to this invention illustrate the clear advantages attained by the process of this invention.

EXAMPLE III

20 Kg. of a 10% solution of polybutadiene in hexane, prepared in accordance with Example 1, is emulsified with a solution of 20 kg. of water and 70 g. of laurylpyridinium chloride ("Dehyquart C") by means of the "Ultra-Turrax" mixer. Under agitation, 10 kg. of plasticizer 10% aqueous suspension of highly active silicic acid ("Ultrasil VN 3") is added to the emulsion. The precipitation and isolation of the rubber mixture as a pourable powder are effected as described in Example 2.

Analogously to Example 2, with the aid of a simple powder mixer, 2 parts of stearic acid, 5 parts of ZnO, 2.5 parts of diethylene glycol, 2 parts of sulfur, 1 part of N-cyclohexylbenzothiazole sulfenamide, 0.5 part of diphenylguanidine, and 15 parts of a light-colored lasticizer oil (Trademark "Ingraplast NS") are admixed during the course of 7 minutes. The thus-obtained pourable mixture is introduced directly into an automatic injection molding machine suitable for the production of elastomer articles. In comparison thereto, a mixture of the same composition which was obtained in a conventional manner from solid elastomer is examined. The results are set out in the Table as Experiments 5 and 6. The advantages attained by the present invention are particularly apparent from the examples of tensile strength and modulus at 300%.

EXAMPLE IV

800 G. of naphthenic mineral oil ("Ingraplast NS", is stirred into 20 kg. of a 10% solution of polybutadiene ($[\eta] = 3.5$) in hexane, prepared according to Example I. The oil-containing solution is formed into a stable emulsion with a solution of 73 g. of alkyl trimethylammonium bromide (alkyl = $C_{12} - C_{16}$; "Vantoc N") in 20 kg. of water, with the aid of an "Ultra-Turrax" mixer.

28 kg. of a 5% aqueous dispersion of HAF carbon black ("Philblack O"), produced with the addition of 1% of "Vantoc N", based on the carbon black, is added to this emulsion under agitation. The precipitation and isolation of the rubber mixture, containing oil and carbon black, to a pourable powder product are conducted as set forth in Example II.

This dry product is subsequently mixed, analogously to Examples II and III, with 2.2 parts of sulfur, 1.2 parts of N-cyclohexylbenzothiazole sulfenamide, 5 parts of ZnO, and 2 parts of stearic acid, based on the amount of elastomer. The thus-obtained elastomer mixture is directly extruded into test specimens and vulcanized at 143°C. The results are compiled in the Table as Experiment 7 in comparison to a conventionally produced mixture of solid rubber having the same mixture components, compiled as Experiment 8. The physical properties of the material prepared according to this invention are generally superior to those exhibited by the comparison sample manufactured in accordancce with conventional processing methods.

EXAMPLE V

20 Kg. of a 10% solution of polyoctenamer in hexane ($[\eta] = 0.6$), obtained by metathetical polymerization of cyclooctene, according to the method described in the British Pat. No. 1,104,040 (Goodyear) is emulsified by mixing into a solution of 60 g. of cetyltrimethylammonium bromide ("Dehyquart A") in 20 kg. of water, with the "Ultra-Turrax" agitator. Into this emulsion is stirred 20 kg. of a 5% aqueous suspension of HAF carbon black ("Philblack O"). The precipitation and isolation of the carbon-black-containing rubber mixture as a pourable powder are effected as set forth in Example I.

After admixing 1.5 parts of sulfur, 0.9 part of N-cyclohexylbenzothiazole sulfenamide, 3 parts of ZnO, and 2 parts of stearic acid, based on 100 parts by weight of elastomer, by means of a simple agitator system, the powdery mixture is vulcanized in a press at 143°C. The resultant vulcanizate properties are compiled in the Table as Experiment 9. A comparison sample could not be employed for testing purposes, since, due to its inherent tackiness, the incorporation of fillers on conventional processing machines is impossible.

EXAMPLE VI

20 Kg. of a polybutadiene solution produced according to Example I is emulsified in 20 kg. of an aqueous solution of 60 g. of cetyltrimethylammonium chloride ("Dehyquart A") and 10 g. of sulfuric acid using the "Ultra-Turrax" emulsifying device. A suspension of 1 kg. of HAF carbon black ("Philblack O"), 30 g. of sulfur, 18 g. of "Vulkacit CZ", 60 g. of zinc oxide, and 40 g. of stearic acid in 20 kg. of water is stirred into the thus-obtained emulsion. The precipitation and isolation of the mixture of elastomer and the auxiliary agents as a pourable powder are effected as described in Example I.

The thus-obtained powder is introduced into a rolling mill (200 × 450 mm.) at 50°C. A continuous sheet is produced after only a single pass. After one minute, the mixture is discharged in a layer having a thickness of 4 mm. Thereafter, test bodies are prepared therefrom in a vulcanizing press at 143°C. The properties of these vulcanized test bodies are compared with those of a vulcanizate composed of the same components, but manufactured from a mixture of solid elastomer produced in the conventional manner by means of internal mixer and rolling mill. The results are compiled in the Table as Experiments 10 and 11 respectively. These results here again demonstrate in all tests the superiority of the powdered rubber of the present invention.

EXAMPLE VII

20 Kg. of a 10% EPDM rubber solution in hexane is mixed with a solution of 20 kg. of water and 70 g. of alkyl trimethylammonium bromide (alkyl = $C_{12} - C_{16}$;

trade name "Vantoc N") using the "Ultra-Turrax" mixer. 20 kg. of a 5% aqueous suspension of HAF carbon black ("United HAF") is incorporated into the thus-obtained emulsion under agitation. The precipitation and isolation of the rubber mixture as a pourable powder are conducted as set forth in Example II.

Data obtained from the Experiments carried out in the above Examples is set forth in the following Table.

| Experiment No. | Raw Mixture | Vulcanization at 143°C | Tensile Strength kg/cm² | Elongation % | Modulus 300 % | Permanent Elongation % | Hardness °Shore | Elasticity DIN 20°C (22 C*) | 75°C | Compr. Set |
|---|---|---|---|---|---|---|---|---|---|---|
| 1 | Elastomer mixture of this invention | 30' | 132 | 396 | 92 | 7 | 65 | 56 | 56 | |
| | | 60' | 135 | 314 | 100 | 7 | 65 | 58 | 58 | 14 |
| | | 120' | 140 | 358 | 110 | 6 | 65 | 58 | 58 | |
| 2 | Masticator or rolling mill mixture of solid elastomer | 30' | 76 | 310 | 74 | broken | 64 | 56 | 56 | |
| | | 60' | 77 | 298 | — | ken | 65 | 56 | 58 | 19 |
| | | 120' | 74 | 272 | — | | 65 | 56 | 57 | |
| 3 | Elastomer mixture of this invention | 30' | 120 | 266 | 83 | 7 | 73 | 47 | 42 | |
| | | 60' | 125 | 228 | 95 | broken | 75 | 48 | 53 | |
| | | 120' | 115 | 224 | 106 | ken | 75 | 48 | 53 | |
| 4 | Masticator or rolling mill mixture of solid elastomer | 30' | 85 | 210 | 78 | '' | 70 | 51 | 55 | |
| | | 60' | 85 | 206 | 80 | '' | 70 | 52 | 55 | |
| | | 120' | 91 | 222 | 80 | '' | 70 | 52 | 54 | |
| 5 | Elastomer mixture of this invention | | 80 | 476 | 59 | | 81 | 52* | 50 | |
| 6 | Normal mixture of solid elastomer | | 66 | 466 | 48 | | 74 | 51* | 48 | |
| 7 | Elastomer mixture of this invention | 30' | 148 | 428 | 86 | | 59 | 49 | 54 | |
| | | 60' | 145 | 372 | 100 | | 60 | 50 | 55 | |
| | | 90' | 135 | 332 | 110 | | 61 | 51 | 60 | |
| 8 | Mixture of solid Elastomer | 30' | 115 | 342 | 96 | | 61 | 50 | 56 | |
| | | 60' | 104 | 310 | 97 | | 61 | 50 | 56 | |
| | | 90' | 122 | 340 | 94 | | 61 | 50 | 56 | |
| 9 | Elastomer mixture of this invention | 60' | 113 | 348 | 94 | | 64 | 41* | 47 | |
| 10 | Powder of the present invention | 30' | 130 | 400 | 92 | | 63 | 56* | 56 | |
| | | 60' | 133 | 391 | 95 | | 63 | 58* | 57 | |
| | | 90' | 128 | 380 | 93 | | 63 | 58* | 57 | |
| 11 | Conventional mixture of solid mixture of solid elastomer | 30' | 105 | 368 | 95 | | 62 | 56* | 56 | |
| | | 60' | 111 | 358 | 98 | | 63 | 56* | 58 | |
| | | 90' | 109 | 371 | 92 | | 62 | 56* | 57 | |

Physical property measurements given for the preceding Examples were determined by standard testing methods. Tensile strength was determined according to DIN 53 504. Elongation was measured according to DIN 53 504. Modulus C 300% was tested by DIN 53 504. Permanent elongation was measured by DIN 53 504. Shore Hardness was determined according to DIN 53 505, and elasticity was determined according to DIN 53 512. Compression Set was determined according to DIN 53 517.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition of matter capable of being compounded and sulfur cured to form a rubbery vulcanizate, said composition comprising discrete, finely divided, tack-free, pourable, filler-containing elastomer particles having an average diameter of 1-500 microns and containing a solid, finely divided elastomer filler uniformly dispersed therein, said composition when compounded and sulfur cured forming a vulcanizate exhibiting increased tensile strength as compared to an otherwise identical vulcanizate prepared by mechanically mixing the elastomer and filler, and being prepared by:

gradually introducing an admixture of (a) an aqueous emulsion of 1-50 percent by weight of an elastomer selected from the group consisting of polybutadienes having a 1,2-content of 15–75 percent, polyalkenamers, solution polymerized styrenebutadiene copolymers, ethylene-propylene copolymers and ethylenepropylene-diene copolymers, said aqueous emulsion consisting essentially of (i) a solution of said elastomer dissolved in a volatile, inert organic solvent having a boiling point below 100° C, (ii) an elastomer emulsifying amount of a quaternary ammonium salt cationic surfactant and (iii) water, the volume ratio of the aqueous phase to the organic solvent phase of said emulsion being from about 0.25:1 to about 2.5:1 respectively, and (b) an aqueous suspension or dispersion of a solid, finely divided elastomer filler, the volume ratio of aqueous filler to said aqueous emulsion in said admixture being from about 0.2:1 to about 2.0:1, into a 0.1 to 5 fold volume of an aqueous alkali silicate solution containing 2–20 moles of $SiO_2$ per mole of said quaternary ammonium salt while maintaining said silicate solution at a pH greater than 2 to avoid a condensation reaction of the silicate anions, and simultaneously evaporating said volatile organic solvent to form said filler-containing elastomer particles.

2. A composition according to claim 1, wherein said elastomer is a polybutadiene having a vinyl group content of 20–50%.

3. A composition according to claim 2, wherein said elastomer is a polyalkenamer.

4. A composition according to claim 1, wherein said filler is 1–200% by weight, based on the elastomer, of carbon black.

5. A composition according to claim 4, containing 40–110% by weight, based on the elastomer, of carbon black.

6. A composition according to claim 1, wherein said filler is 1-400% by weight, based on the elastomer, of silicic acid.

7. A composition according to claim 6, containing 25–150% by weight, based on the elastomer, of silicic acid.

8. A composition according to claim 1, further comprising 1–200% by weight, based on the elastomer, of a mineral oil plasticizer.

9. A composition according to claim 8, containing 20–70% by weight, based on the elastomer, of said plasticizer.

10. A composition according to claim 1, further comprising an auxiliary agent selected from the group consisting of anti-aging agents, zinc oxide, stearic acid, sulfur and vulcanization accelerators.

11. A shaped object prepared by shaping and vulcanizing the composition of claim 10.

12. A shaped object according to claim 11, wherein said composition contains, based on the elastomer, 40–110% by weight carbon black and 20–70% by weight of a mineral oil plasticizer.

* * * * *